United States Patent [19]
Na

[11] Patent Number: 5,187,576
[45] Date of Patent: Feb. 16, 1993

[54] STEREO RADIO FREQUENCY MODULATING SYSTEM

[75] Inventor: Il-gu Na, Anyang, Rep. of Korea

[73] Assignee: Samsung Electronics Co., Ltd., Suwon, Rep. of Korea

[21] Appl. No.: 691,787

[22] Filed: Apr. 26, 1991

[30] Foreign Application Priority Data

Oct. 11, 1990 [KR] Rep. of Korea .................. 90-15544

[51] Int. Cl.$^5$ .............................................. H04N 7/04
[52] U.S. Cl. ................................... 358/144; 358/143
[58] Field of Search ............... 358/144, 143, 142, 186, 358/145, 310, 188; 381/4, 3, 2, 12, 14

[56] References Cited

U.S. PATENT DOCUMENTS

| | | | |
|---|---|---|---|
| 3,099,707 | 7/1963 | Dome | 358/144 |
| 4,405,944 | 9/1983 | Eilers et al. | 358/144 |
| 4,646,150 | 2/1987 | Robbins et al. | 358/144 |
| 4,761,814 | 8/1988 | Sugai et al. | 381/13 |

FOREIGN PATENT DOCUMENTS

| | | | |
|---|---|---|---|
| 58-084575 | 5/1983 | Japan | 358/144 |
| 58-218279 | 12/1983 | Japan | 358/144 |

OTHER PUBLICATIONS

Numaguchi, Yasutaka et al., "Multichannel Sound System For Television Broadcasting", IEEE Transactions on Consumer Electronics, vol. CE-27, No. 3, Aug. 1981, pp. 366-371.

*Primary Examiner*—James J. Groody
*Assistant Examiner*—Safet Metjahic
*Attorney, Agent, or Firm*—Robert E. Bushnell

[57] ABSTRACT

Disclosed is a stereo RF modulating system which converts stereo information along with image information to RF signals in an image recording/reproducing system. Conventional RF modulators can output mono audio information only and thus cannot provide viewers with high fidelity sound. Accordingly, the stereo RF modulating system comprising an audio matrix means, a pilot signal source, a first mixer, a RF carrier oscillator, a first and second local oscillators, a video modulator, first and second modulators, a second mixer, a first switching device, and a second switching device, converts stereo information along with image information to RF signals, and thus provides high fidelity sound.

16 Claims, 3 Drawing Sheets $-F_1$      F      $+F_1$ $-F_2$      F      $+F_2$ $-F_2\ -F_1$    F    $+F_1\ +F_2$

F      $+F_1\ +F_2$

```
  F   = PRIMARY OSC. FREQ.
-F₁ =   F-1ST OSC. FREQ.
-F₂ =   F-2ND OSC. FREQ.
+F₁ =   F+1ST OSC. FREQ.
+F₂ =   F+2ND OSC. FREQ.
```

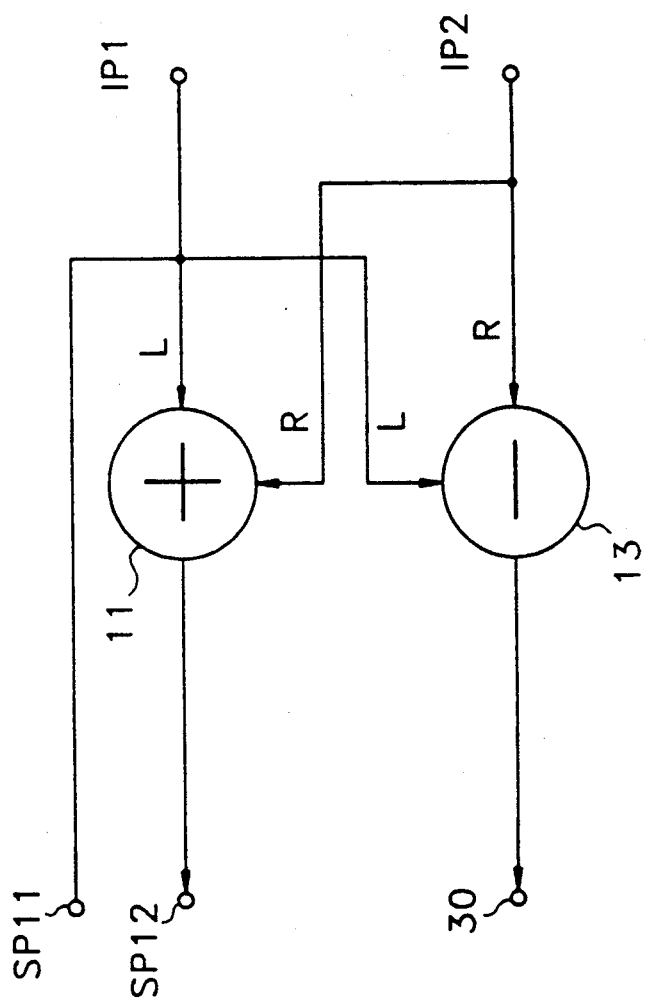

STEREO RADIO FREQUENCY MODULATING SYSTEM

BACKGROUND OF THE INVENTION

This invention relates to an image recording/reproducing system, and more particularly to a stereo radio frequency modulating system for converting stereo sound information and image information to radio frequency signals.

Generally, an image recording/reproducing system refers to a system which records image and sound information onto a recording medium and/or reproduces image and sound information recorded from a recording medium. Sometimes, a radio frequency (hereinafter, referred to as RF) converter which converts sound and image information into RF form is attached to the image recording/reproducing system. During the reproducing process, the RF converter converts the reproduced sound and image information into a RF signal and transmits it to a television receiver or a displaying system.

At present, the RF modulator used in the image recording/reproducing system consists of a frequency converter for the image signal, another one for the sound signal, and a mixer for mixing their outputs.

The image recording/reproducing system having RF converters as above, reproduces the audio signals in left and right channels and, mixes both channels in an audio signal mixer, and then supplies the mixed audio signal to another mixer which mixes it with the RF image signal. Thus, a television receiver which receives the image and sound RF signal, outputs sound in mono form.

Therefore, since current RF modulators can only output sound information in mono form, and not of high fidelity sound.

SUMMARY OF THE INVENTION

Accordingly, it is an object of this invention to provide a stereo RF modulator which can convert stereo sound signals along with image information, into a RF signal, so as to provide viewers with high fidelity sound in image recording/reproducing systems.

To accomplish the above object, a stereo radio frequency modulating system according to the present invention includes:

a first audio input terminal for receiving a left channel audio signal;

a second audio input terminal for receiving a right channel audio signal;

an image input terminal for receiving an image signal;

a control signal input terminal for receiving a control signal by which a stereo or a mono audio signal is selectively output in accordance with a user's selection;

audio matrix for receiving the left channel audio signal and right channel audio signal and generating a predetermined mono signal;

a pilot signal source for generating a pilot signal so that an audio signal sent to a television receiver is distinguished between the stereo or mono audio signal;

a first mixer for mixing the right channel audio signal with the pilot signal sent from said pilot signal source;

a radio frequency carrier local oscillator for generating a radio frequency signal having a radio frequency carrier related to the image signal;

a video modulator for amplitude-modulating the image signal with the radio frequency carrier local oscillation signal sent from the radio frequency carrier local oscillator through a first buffer amplifier;

a first switching device for receiving the mono audio signal sent from the audio matrix and the left channel audio signal selectively outputting one of them in accordance with a control signal selected by the user;

a second switching device for receiving an output signal of said first mixer through a third buffer amplifier and for selectively transmitting or cutting off the received signal, which is operated by linking with said first switching device in accordance with said control signal supplied through said control signal input terminal;

a first and second local oscillators for generating signals having different frequencies from each other, a first audio modulator for frequency-modulating the selected audio signal outputted from the first switching device through a second buffer amplifier with the local oscillation signals of the radio frequency carrier local oscillator and said first local oscillator;

a second audio modulator for frequency modulating the selected audio signal outputted from said second switching device with the local oscillation signals of said radio frequency carrier local oscillator and said second local oscillator; and a second mixer for mixing the outputs of first and second audio modulator with the output of said video modulator, and generating a radio frequency image signal.

The above object and other features and advantages of this invention will become apparent from the following descriptions of the accompanying drawings.

BRIEF DESCRIPTION OF THE DRAWINGS

FIG. 2A is a waveform diagram of the image information applied to the image input terminal;

FIG. 2B is an output waveform diagram of the video modulator;

FIG. 2C is an output waveform diagram of the pilot modulator;

FIG. 2D is a spectral diagram of the output of the first modulator;

FIG. 2E is a spectral diagram of the output of the second modulator;

FIG. 2F is a spectral diagram of the output of the second mixer;

FIG. 2G is a spectral diagram of the output of the side band amplifier.

FIG. 3 is a circuit diagram of an alternative exemplary embodiment of the audio matrix shown in FIG. 1.

DETAILED DESCRIPTION OF THE INVENTION

Figure 1:
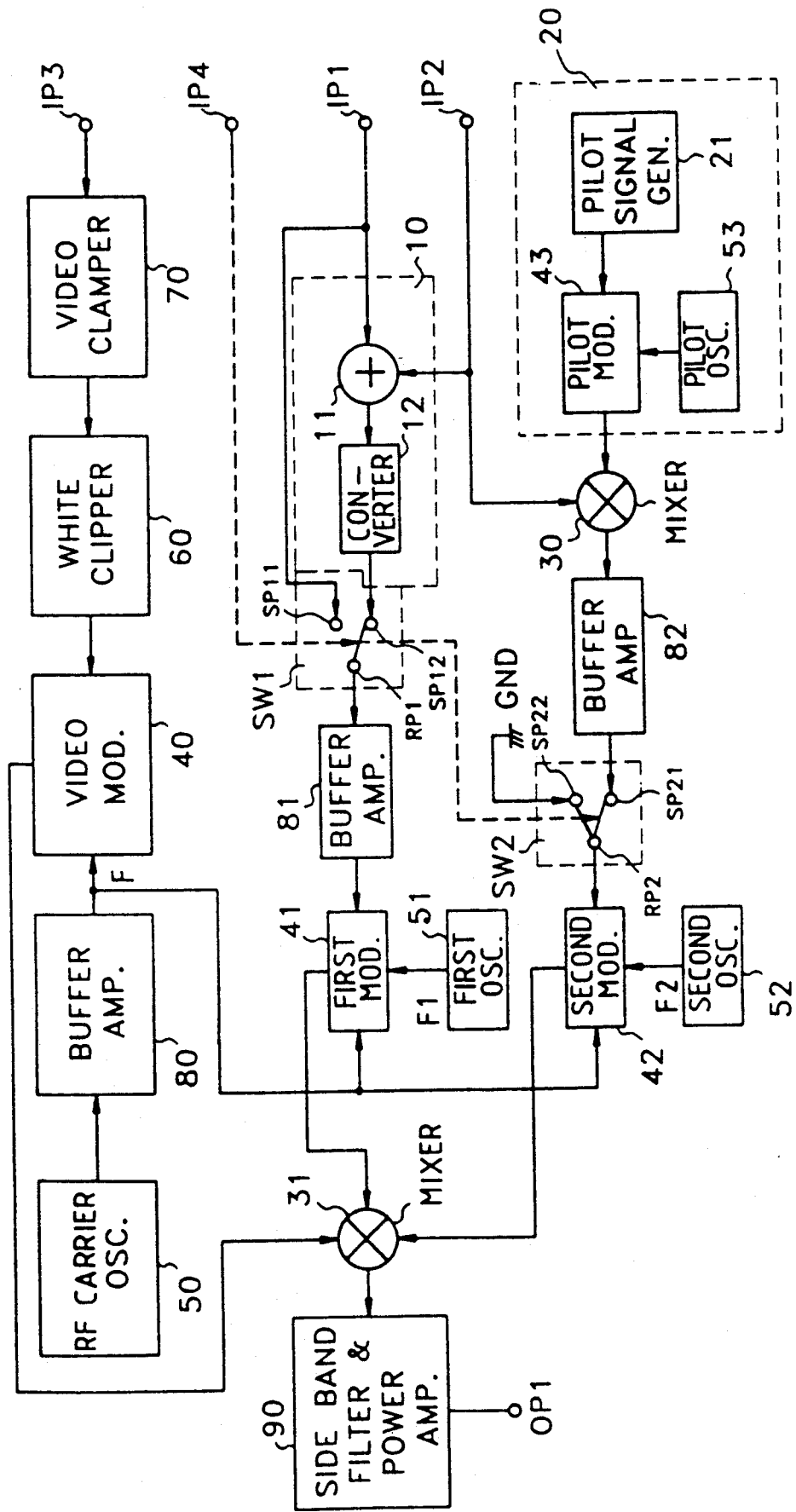
FIG. 1 is a circuit diagram of a stereo high frequency modulating system according to this invention.

A stereo high frequency modulating system according to this invention will be described with reference to the circuit diagram of FIG. 1.

An audio matrix 10 includes an adder 11 whose inputs are connected to a first audio input terminal IP1 and a second audio input terminal IP2, and a converter 12 whose input terminal is connected to the output terminal of the adder 11.

A pilot signal source 20 includes a pilot signal generator 21 for generating a pilot code in quasi-noise form, a pilot oscillator 53 for generating a pilot oscillation signal, and a pilot modulator 43 whose inputs are connected to the pilot signal generator 21 and the pilot oscillator 53.

A video modulator 40 has one input terminal to which an image input terminal IP3 is connected through a video clamper 70 and a white clipper 60, and has the other input terminal to which an output terminal of a RF carrier oscillator 50 is connected through a first buffer amplifier 80.

A first mixer 30 has one input terminal to which the second audio input terminal IP2 is connected and has the other input terminal to which an output terminal of the pilot modulator 43 of the pilot signal source 20 is connected.

A first switch SW1 has its first selection point SP.11 connected to the first audio input terminal IP1 and has its second selection point SP12 connected to the output terminal of the converter 12 of the audio matrix 10.

A second switch SW2 has its first selection point SP21 to which an output terminal of the first mixer 30 is connected through a third buffer amplifier 82 and has its second selection point SP22 connected to ground GND.

A first modulator 41 has one input terminal to which the reference point RP1 of the first switch SW1 is connected through a second buffer amplifier 81, another input terminal to which the output terminal of the RF carrier oscillator 50 is connected through the first buffer amplifier 80, and the other input terminal connected to a first local oscillator 51.

A second modulator 42 has one input terminal to which the output terminal of the RF carrier oscillator 50 is connected through the first buffer amplifier 80, and the other input terminal connected to a second local oscillator 52.

A second mixer 31 has its input terminals respectively connected to the video, first and second modulators 40, 41, and 42 and has its output terminal connected to a RF output terminal OP1 through a side band filter and power amplifier 90.

FIG. 2 shows diagrams of operational waveforms and frequency characteristics of the essential parts of the circuit shown in FIG. 1.

A detailed description of the operation of the circuit shown in FIG. 1 follows with reference to FIGS. 2A through 2G which are diagrams of operational waveforms and frequency characteristics.

The video clamper 70 limits the voltage level of the image signal received through the image input terminal IP3 and thereby prevents the image signal from being overmodulated.

The white clipper 60 removes white noise exceeding 100% from the image signal received from the video clamper 70.

The RF carrier oscillator 50 generates a RF carrier oscillation signal F of the same frequency as that of the desired RF image signal and supplies it in common to the video, first and second modulators 40, 41 and 42 through the first buffer amplifier 80.

Figure 2A:
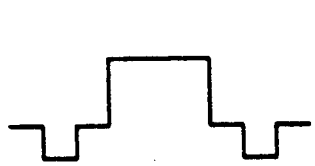
FIGS. 2A through 2G are waveform diagrams showing waveforms and frequency characteristics of the essential parts of the circuit shown in FIG. 1, where.
Figure 2B:
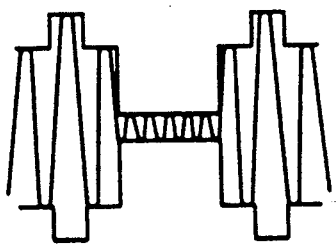
Figure 2C:
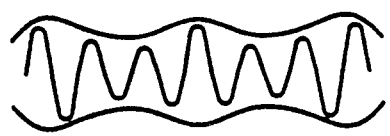

The video modulator 40 amplitude-modulates the image signal shown in FIG. 2A received from the white clipper 60 with the RF carrier oscillation signal F received through the first buffer amplifier 80 and supplies the amplitude-modulated image signal shown in FIG. 2B to the second mixer 31.

The audio matrix 10 adds the first audio signal received through the first audio input terminal IP1 and the second audio signal received through the second audio input terminal IP2, and generates a mono signal by halving the amplitude of the added audio signal by the converter 12.

The pilot signal source 20 generates an amplitude-modulated pilot signal which allows for the de-matrix of stero signals at the receiving end into a left channel (hereinafter, referred to as L-channel) and a right channel (hereinafter, referred to as R-channel), and supplies it to the first mixer 30. That is, the pilot signal generator 21 generates a pilot code in quasi-noise form, the pilot oscillator 53 generates a pilot oscillation signal of the same frequency as that of a predetermined carrier frequency, and the pilot modulator 43 amplitude-modulates the pilot code in quasi-noise form by the pilot oscillation signal, and supplies an amplitude modulated pilot signal as in FIG. 2C to the first mixer 30.

The first mixer 30 mixes the R-channel audio signal received from the second input terminal IP2 with the pilot signal supplied from the pilot signal source 20 and supplies it to the first selection point SP21 of the second switch SW2 through the third buffer amplifier 82.

Also, a control signal that operates the first and second switches SW1 and SW2 to select either the stereo signal or the mono signal is applied to the control signal input terminal IP4.

In the stereo mode, the first switch SW1 selects the L-channel audio signal of the first audio input IP1 which is connected to the first selection point SP11 of the first switch SW1 when a control signal of a high logic level is received from the control signal input terminal IP4 and relays it to the first modulator 41 through the second buffer amplifier 81. Simultaneously, the second switch SW2 selects the output of the third buffer amplifier 82 which is connected to the first selection point SP21 and relays it to the second modulator 42.

Conversely, in the mono mode, the first switch SW1 selects the output of the converter 12 connected to the second selection point SP12 when a control signal of a low logic level is received from the control signal input terminal IP4 and relays it to the first modulator 41 through the second buffer amplifier 81. Simultaneously, the second switch SW2 grounds the input of the second modulator 42 through the second selection point SP22, thereby preventing the introduction of noise to the system.

Figure 2D:
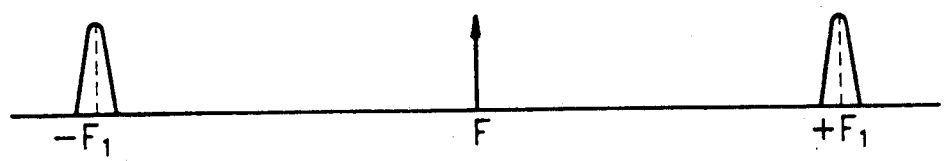

The first modulator 41 frequency-modulates the signal received through the second buffer amplifier 81 from the first switch SW1, which is the L-channel audio signal from the first audio input terminal IP1 during the stereo mode or the mono signal from the converter 12 during the mono mode, with the RF carrier oscillation signal F outputted by the RF carrier oscillator 50 received through the first buffer amplifier 80, and converts first this frequency-modulated audio signal by the first local oscillation signal F1 received from the first local oscillator 51, and supplies this frequency-modulated audio signal, with the frequency characteristics shown in FIG. 2D to the second mixer 31.

Figure 2E:
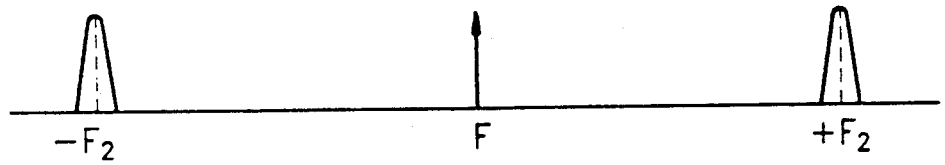

The second modulator 42 frequency-modulates the R-channel audio signal mixed with the pilot signal received through the second switch SW2 from the third buffer amplifier 82 during the stereo mode by the RF carrier primary oscillation signal F output by the RF carrier primary oscillator 50 received through the first buffer amplifier 80, and converts the frequency-modulated audio signal by the second local oscillation signal F2 from the second local oscillator 52, and supplies the frequency-modulated R-channel audio signal with the frequency characteristics shown in FIG. 2E to the second mixer 31.

Figure 2F:
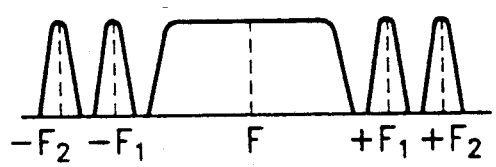

The second mixer 31 mixes the amplitude-modulated image signal received from the video modulator 40 with the frequency-modulated audio signals from the first and second modulators 41 and 42 and supplies the image/sound mixed RF signal having with the frequency characteristics of FIG. 2F to a side band filter and power amplifier 90.

Figure 2G:
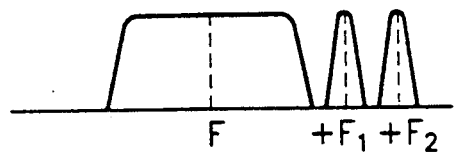

The side band filter and power amplifier 90 filters out the RF signals output by the second mixer 31, and separates the RF signal corresponding to image and sound components of one side band shown in FIG. 2G, and after power amplification of the filtered RF signal, outputs it through the RF output terminal OP1.

FIG. 3 is a circuit diagram of an alternative exemplary embodiment of the audio matrix means 10 of FIG. 2, to modulate a multivoice signal (i.e. bilingual broadcasting signal) or a stereo signal.

Referring to FIG. 3, an alternative exemplary embodiment of the audio matrix 10 shown in FIG. 1, comprising:

an adder 11 for adding the signal received from the first audio input terminal IP1, which is the L-channel audio signal during the stereo broadcast or a first language audio signal during the multivoice broadcast, to the signal received from the second audio input terminal IP2, which is the R-channel audio signal during the stereo broadcast or a second language audio signal during the multivoice broadcast, and for outputting this signal to the second selection point SP12 of the first switch SW1; and a subtracter 13 for subtracting the signal received from the first audio input terminal IP1, which is the L-channel audio signal during the stereo broadcast, and the first language audio signal during the multivoice broadcast, from, the signal received from the R-channel input terminal IP2 which is the R-channel audio signal during the stereo broadcast and the second language audio signal during the multivoice broadcast, and for outputting this signal to the first mixer 30.

This alternate embodiment has its two inputs connected to the first and second audio input terminals IP1 and IP2 respectively, and has one output terminal connected to the first mixer 30 and the other output connected to the second selection point SP12 of the first switch SW1.

In addition, the L-channel input terminal IP1, while being connected to the adder 11 and subtracter 13, is also connected to the first selection point SP11 of the first switch SW1.

The first and second switches SW1 and SW2 shown in FIG. 1 select the first selection points SP11 and SP21 respectively during the stereo or multivoice broadcast, and select the second selection points SP12 and SP22 respectively during mono broadcast.

Therefore, the output of the side band filter and power amplifier 90 shown in FIG. 1 becomes a RF signal where the L-channel audio component and the L-R audio components are mixed with the image signal during the stereo mode, and it becomes a RF signal where the first language sound component and the signal subtracting the second language sound component from the first language sound component are mixed with the image signal, during the multivoice mode.

As described above, there is an advantage of being able to convert stereo and multivoice signals into RF signals using an audio matrix and two frequency modulators that modulate audio signals according to this invention.

What is claimed is:

1. A stereo radio frequency modulating system, comprising:
    a first audio input terminal for receiving a left channel audio signal;
    a second audio input terminal for receiving a right channel audio signal;
    an image input terminal for receiving an image signal;
    a control signal input terminal for receiving a control signal indicating a mode of operation for the stereo radio frequency modulating system, the mode of operating being one of a stereo and a mono mode;
    audio matrix means for receiving said left channel audio signal and said right channel audio signal, and for generating a mono signal;
    a pilot signal source for generating a pilot signal so that an audio signal output to a television receiver is distinguishable between the stereo and the mono audio signal;
    a first mixer for mixing said right channel audio signal with said pilot signal;
    a radio frequency carrier local oscillator for generating a radio frequency carrier local oscillation signal;
    a video modulator for generating a video signal by amplitude-modulating said image signal with said radio frequency carrier local oscillation signal;
    a first switching device for receiving the mono audio signal from said audio matrix means and the left channel audio signal from said first audio input terminal and selectively outputting one of either the mono audio signal and the left channel audio signal in dependance upon the mode of operation;
    a second switching device for receiving an output signal of said first mixer and for selectively transmitting and cutting off the received signal in dependence upon the mode of operation;
    a first local oscillator and a second local oscillator for generating a first oscillation signal and a second oscillation signal having a first frequency of oscillation and a second frequency of oscillation, respectively;
    a first audio modulator for generating a first modulator signal by frequency-modulating the selected audio signal from said first switching device with the radio frequency carrier local oscillation signal and said first oscillation signal;
    a second audio modulator for generating a second modulator signal by frequency-modulating the selected audio signal from said second switching device with the radio frequency carrier local oscillation signal and the second oscillation signal; and
    a second mixer for mixing the second modulator signal, first modulator signal, and said video signal to generate a radio frequency image signal.

2. A stereo radio frequency modulating system as claimed in claim 1, wherein said audio matrix means comprises:
    means for generating a mono audio signal by adding said left channel audio signal and the right channel audio signal; and a converter for converting said mono audio signal to a scaled amplitude, and outputting to said first switching device.

3. A stereo radio frequency modulating system as claimed in claim 1, wherein said audio matrix means comprises:
 means for adding said left channel audio signal and said right channel audio signal from said first input terminal and said second audio input terminal, and outputting to said first switching device; and
 a subtracter for subtracting said left channel audio signal from said right channel audio signal and outputting to said first mixer.

4. A stereo radio frequency modulating system, comprising:
 audio matrix means for adding a first audio channel signal and a second audio channel signal to generate a mono signal;
 first switching means for generating a first selected signal, the first selected signal being one of the mono signal and the second audio channel signal in dependance upon whether the stereo radio frequency modulating system is operating in a corresponding one of a mono mode and a stereo mode, respectively;
 second switching means for generating a second selected signal, the second selected signal being the first audio channel signal if the stereo radio frequency modulating system is operating in the stereo mode;
 means for generating a first oscillation signal and a second oscillation signal;
 a first audio modulator for generating a first modulated signal by frequency-modulating the first selected audio signal with a radio frequency carrier signal and the first oscillation signal;
 a second audio modulator for generating a second modulated signal by frequency-modulating the second selected signal with the radio frequency carrier signal and the second oscillation signal; and
 a second mixer for mixing the first modulated signal, the second modulated signal, and a video signal to generate a radio frequency image signal.

5. The stereo radio frequency modulating system as claimed in claim 4, wherein the audio matrix means comprises:
 adder means for generating a adder output signal by adding the first audio channel signal and the second audio channel signal, and
 converter means for receiving the adder output signal and converting the adder output signal to a predetermined level.

6. The stereo radio frequency modulating system as claimed in claim 4, further comprising:
 pilot signal means for generating a pilot signal indicating whether the stereo radio frequency modulating system is operating in the stereo or mono mode; and
 first mixer means for mixing the first audio channel signal with the pilot signal before the first audio channel signal becomes the input to the second switching means.

7. The stereo radio frequency modulating system as claimed in claim 4, further comprising:
 radio frequency carrier oscillator means for generating the radio frequency carrier signal;
 video modulator means for generating the video signal by amplitude-modulating an image signal with the radio frequency carrier signal.

8. A radio frequency modulating system comprising:
 audio matrix means for generating an added signal by adding a first audio channel signal and a second audio channel signal, and for generating a subtracted signal by subtracting the first audio channel signal and the second audio channel signal;
 radio frequency carrier oscillator for generating a radio frequency carrier signal;
 video modulator means for generating a video signal by amplitude-modulating an image signal with the radio frequency carrier signal;
 first switching means for generating a first selected signal, the first selected signal being one of the added signal and the second audio channel signal;
 second switching means for generating a second selected signal, the second selected signal selectively being the subtracted signal;
 means for generating a first oscillation signal and a second oscillation signal;
 a first audio modulator for generating a first modulator signal by frequency-modulating the first selected audio signal with the radio frequency carrier signal and the first oscillation signal;
 a second audio modulator for generating a second modulator signal by frequency-modulating the second selected signal with the radio frequency carrier signal and the second oscillation signal; and
 a second mixer for mixing the first modulator signal, the second modulator signal, the video signal to generate a radio frequency image signal.

9. A method for modulating a stereo radio signal, comprising:
 adding a first audio channel signal and a second audio channel signal to generate a mono signal;
 generating a first selected signal by selecting one of the mono signal and the second audio channel signal in dependance upon whether the stereo radio frequency modulating system is operating in a corresponding one of a mono mode and a stereo mode, respectively;
 generating a second selected signal by selecting the first audio channel signal if the stereo radio frequency modulating system is operating in the stereo mode;
 generating a first modulated signal by frequency-modulating the first selected audio signal with a radio frequency carrier signal and the first oscillation signal;
 generating a second modulated signal by frequency-modulating the second selected signal with the radio frequency carrier signal and the second oscillation signal; and
 mixing the first modulated signal, the second modulated signal, and a video signal to generate a radio frequency image signal.

10. The method for modulating a stereo radio signal according to claim 9, further comprising:
 generating a pilot signal for indicating whether the stereo radio frequency modulating system is operating in one of a mono mode and a stereo mode; and
 first mixer means for mixing the first audio channel signal with the pilot signal before generating a second selected signal.

11. A television signal modulating circuit having a stereo mode and a mono mode, said circuit comprising:
   audio matrix means for receiving first channel audio signals and right channel audio signals, and for generating combined signals obtained by combining said first channel audio signals and said right channel audio signals;
   a first switch for providing one of said combined signals and said first channel audio signals as first selected signals;
   a pilot signal source for generating a pilot signal indicative of said stereo mode and said mono mode;
   a first mixer for mixing said second channel audio signals with said pilot signal to generate mixed signals;
   a second switch for selectively providing said mixed signals;
   a radio frequency carrier local oscillator for generating a radio frequency carrier local oscillation signal;
   a video modulator for generating a video signal by amplitude-modulating received image signals with said radio frequency carrier local oscillation signal;
   local oscillator means for generating a first oscillation signal and a second oscillation signal;
   first modulator means for generating first modulator signals by frequency-modulating said first selected signals with said radio frequency carrier local oscillation signal and said first oscillation signal;
   second modulator means for generating second modulator signals by frequency-modulating said mixed signals provide by said second switch with said radio frequency carrier local oscillation signal and said second oscillation signal; and
   a second mixer for mixing said second modulator signals, said first modulator signals, and said video signals to generate modulated signals.

12. A television signal modulating circuit as claimed in claim 11, further comprising a side band filter for filtering out side bands of said modulated signals.

13. A television signal modulating circuit as claimed in claim 11, further comprising a white clipper for removing white noise and a video clamper for limiting a voltage level of said image signals received by said video modulator.

14. A television signal modulating circuit as claimed in claim 11, wherein said first switch provides said combined signals and said second switch provides a reference potential in said mono mode.

15. A television signal modulating circuit as claimed in claim 11, wherein said first switch provides said first channel audio signals and said second switch provides said mixed signals if said stereo mode.

16. A television signal modulating circuit as claimed in claim 11, wherein said pilot signal source comprises:
   pilot signal generator means for generating a pilot code in a quasi-noise form;
   pilot oscillator means for generating a pilot oscillation signal; and
   pilot modulator means for generating said pilot signal by modulating said pilot oscillation signal with said pilot code.

* * * * *

UNITED STATES PATENT AND TRADEMARK OFFICE
CERTIFICATE OF CORRECTION

PATENT NO. : 5,187,576
DATED : 16 February 1993
INVENTOR(S) : Il-Gu Na

It is certified that error appears in the above-indentified patent and that said Letters Patent is hereby corrected as shown below:

Column 2, Line 39, after "where", change comma "," to colon --:--;

Column 2, Line 52, after semicolon ";" insert --and--;

Column 5, Line 20, after "2" insert --used--:

Signed and Sealed this

Nineteenth Day of August, 1997

*Attest:*

BRUCE LEHMAN

*Attesting Officer*   *Commissioner of Patents and Trademarks*